United States Patent
Hong et al.

(10) Patent No.: US 9,052,753 B2
(45) Date of Patent: Jun. 9, 2015

(54) MOBILE TERMINAL FOR PERFORMING SCREEN UNLOCK BASED ON MOTION AND METHOD THEREOF

(75) Inventors: Hyun-Su Hong, Seongnam-si (KR); Yung-Keun Jung, Suwon-si (KR); Jae-Myeon Lee, Yongin-si (KR); Kyung-Hwa Kim, Seoul (KR)

(73) Assignee: SAMSUNG ELECTRONICS CO., LTD, Suwon-Si (KR)

( * ) Notice: Subject to any disclaimer, the term of this patent is extended or adjusted under 35 U.S.C. 154(b) by 221 days.

(21) Appl. No.: 13/601,968

(22) Filed: Aug. 31, 2012

(65) Prior Publication Data

US 2013/0057496 A1 Mar. 7, 2013

(30) Foreign Application Priority Data

Sep. 1, 2011 (KR) .................. 10-2011-0088440
Aug. 10, 2012 (KR) .................. 10-2012-0088028

(51) Int. Cl.
| | |
|---|---|
| G06F 3/041 | (2006.01) |
| G06F 3/0346 | (2013.01) |
| G06F 3/0488 | (2013.01) |
| G06F 3/048 | (2013.01) |
| H04M 1/67 | (2006.01) |
| G06F 21/31 | (2013.01) |

(52) U.S. Cl.
CPC ............ *G06F 3/0346* (2013.01); *G06F 3/0488* (2013.01); *G06F 3/048* (2013.01); *H04M 1/67* (2013.01); *H04M 2250/12* (2013.01); *H04M 2250/22* (2013.01); *G06F 21/31* (2013.01)

(58) Field of Classification Search
CPC ..... G06F 3/03547; G06F 3/041; G06F 3/048; G06F 3/0484; G06F 3/0485; G06F 3/0488; G06F 21/31; H04M 1/67
USPC ........... 345/156–158, 173; 702/150; 713/183; 715/763, 863
See application file for complete search history.

(56) References Cited

U.S. PATENT DOCUMENTS

| | | | | |
|---|---|---|---|---|
| 5,821,933 | A * | 10/1998 | Keller et al. | 715/741 |
| 6,573,883 | B1 * | 6/2003 | Bartlett | 345/156 |
| 7,509,140 | B2 * | 3/2009 | Elomaa | 455/550.1 |
| 2002/0029341 | A1 * | 3/2002 | Juels et al. | 713/184 |

(Continued)

FOREIGN PATENT DOCUMENTS

| | | |
|---|---|---|
| EP | 1930835 A1 | 6/2008 |
| JP | 2002207703 A | 7/2002 |

(Continued)

OTHER PUBLICATIONS

International Search Report dated Dec. 26, 2012 in connection with International Patent Application No. PCT/KR2012/006799.

(Continued)

*Primary Examiner* — Joe H Cheng

(57) ABSTRACT

A mobile terminal and a method perform screen unlock based on a motion. The mobile terminal includes a motion measure unit, a motion pattern storage, and a controller. The motion measure unit measures a first motion pattern of the mobile terminal. The motion pattern storage stores a second motion pattern set for the mobile terminal. When the first motion pattern of the mobile terminal measured by the motion measure unit coincides with the second motion pattern stored in the motion pattern storage, the controller executes a screen unlock of the mobile terminal.

36 Claims, 14 Drawing Sheets

(56) References Cited

U.S. PATENT DOCUMENTS

| | | | |
|---|---|---|---|
| 2004/0034801 A1* | 2/2004 | Jaeger | 713/202 |
| 2004/0085351 A1* | 5/2004 | Tokkonen | 345/741 |
| 2004/0245352 A1* | 12/2004 | Smith | 236/94 |
| 2005/0060554 A1* | 3/2005 | O'Donoghue | 713/183 |
| 2005/0212760 A1* | 9/2005 | Marvit et al. | 345/156 |
| 2005/0253817 A1* | 11/2005 | Rytivaara et al. | 345/173 |
| 2007/0030963 A1* | 2/2007 | Wyld et al. | 380/44 |
| 2007/0150842 A1* | 6/2007 | Chaudhri et al. | 715/863 |
| 2007/0235539 A1* | 10/2007 | Sevanto et al. | 235/451 |
| 2007/0236330 A1 | 10/2007 | Cho et al. | |
| 2007/0266428 A1* | 11/2007 | Downes et al. | 726/5 |
| 2008/0165145 A1* | 7/2008 | Herz et al. | 345/173 |
| 2009/0006991 A1* | 1/2009 | Lindberg et al. | 715/763 |
| 2009/0083850 A1* | 3/2009 | Fadell et al. | 726/19 |
| 2010/0029255 A1* | 2/2010 | Kim et al. | 455/414.2 |
| 2010/0042954 A1* | 2/2010 | Rosenblatt et al. | 715/863 |
| 2010/0073311 A1* | 3/2010 | Yeh | 345/173 |
| 2011/0053641 A1* | 3/2011 | Lee et al. | 455/556.1 |
| 2011/0080359 A1* | 4/2011 | Jang et al. | 345/173 |
| 2011/0130170 A1* | 6/2011 | Han et al. | 455/566 |
| 2011/0300831 A1* | 12/2011 | Chin | 455/411 |
| 2012/0200513 A1* | 8/2012 | Kim et al. | 345/173 |
| 2012/0223890 A1* | 9/2012 | Borovsky et al. | 345/173 |
| 2013/0050106 A1* | 2/2013 | Chung et al. | 345/173 |
| 2013/0053107 A1* | 2/2013 | Kang et al. | 455/566 |
| 2013/0154921 A1* | 6/2013 | Norman | 345/156 |
| 2013/0333020 A1* | 12/2013 | Deshpande | 726/16 |

FOREIGN PATENT DOCUMENTS

| | | |
|---|---|---|
| JP | 2007116318 A | 5/2007 |
| JP | 2011035855 A | 2/2011 |
| KR | 10-2005-0034940 | 4/2005 |
| KR | 10-0795750 | 1/2008 |
| KR | 10-2009-0025563 | 3/2009 |
| KR | 10-2011-0049368 | 5/2011 |

OTHER PUBLICATIONS

Written Opinion of International Searching Authority dated Dec. 26, 2012 in connection with International Patent Application No. PCT/KR2012/006799.

Extended European Search Report dated Nov. 30, 2012 in connection with European Patent Application No. 12182397.5.

Notice of Preliminary Rejection dated Mar. 9, 2015 in connection with Japanese Patent Application No, 2014-527081; 13 pages.

* cited by examiner

MOBILE TERMINAL FOR PERFORMING SCREEN UNLOCK BASED ON MOTION AND METHOD THEREOF

CROSS-REFERENCE TO RELATED APPLICATION AND CLAIM OF PRIORITY

The present application is related to and claims the benefit under 35 U.S.C. §119 to an application filed in the Korean Intellectual Property Office on Sep. 1, 2011 and assigned Serial No. 10-2011-0088440 and an application filed in the Korean Intellectual Property Office on Aug. 10, 2012 and assigned Serial No. 10-2012-0088028, the contents of which are herein incorporated by reference.

TECHNICAL FIELD OF THE INVENTION

The present disclosure relates to a mobile terminal for performing screen unlock based on a motion and a method thereof.

BACKGROUND OF THE INVENTION

As a mobile terminal such as a cellular phone is recognized as a necessity of a daily life, various personal information has been stored in the mobile terminal. Particularly, as a memory storage capacity of a mobile terminal increases, and functions such as a mobile banking, a mobile stock transaction, etc. are added, personal information such as credit card information, stock transaction information, etc. which need security even more is stored in the mobile terminal. Therefore, recently, various methods for security of personal information stored in a mobile terminal are developed, and one of them is a method for executing a screen lock function when a user does not use a mobile terminal for a set time, and limiting an access of other people. When the screen lock function is executed, other additional functions except a basic function (for example, phone call reception function) of the mobile terminal may be blocked.

To unlock the screen lock of a mobile terminal that has executed a screen lock function, a user may input the same password as a password set in advance via an input key or form the same touch pattern as a touch pattern set in advance on the screen of a touchscreen.

Recently, various screen unlock methods capable of reinforcing security of personal information stored in the mobile terminal while allowing a user to use the mobile terminal more intuitively and conveniently are being studied.

SUMMARY OF THE INVENTION

To address the above-discussed deficiencies of the prior art, it is a primary object to provide at least the advantages described below. Accordingly, an aspect of the present disclosure is to provide a mobile terminal for executing a screen unlock based on a motion and a method thereof, capable of reinforcing security of personal information stored in the mobile terminal.

In accordance with an aspect of the present disclosure, a mobile terminal for executing screen unlock based on a motion is provided. The mobile terminal includes a motion measure unit for measuring a first motion pattern of the terminal, a motion pattern storage for storing a second motion pattern set for the terminal, and a controller for, when the first motion pattern of the terminal measured by the motion measure unit coincides with the second motion pattern stored in the motion pattern storage, executing a screen unlock of the terminal.

The mobile terminal may further include an image execute unit for displaying an image for screen unlock of the terminal. In this case, the controller may control the motion measure unit to measure a motion of the terminal when a response signal is received via a touchscreen in response to the displayed image.

The mobile terminal may further include a touch pattern storage for storing a touch pattern set by a user, and a touch pattern comparator for comparing the user's touch pattern for the terminal with the touch pattern stored in the touch pattern storage. In this case, when the user's touch pattern for the terminal coincides with the stored touch pattern, the controller may output a message indicating a motion of the terminal.

The mobile terminal may further include an image execute unit for displaying images of a door and a key on a screen of the terminal. In this case, the touch pattern comparator may compare a movement pattern of the key image which is touched by the user and dragged up to the door image with the stored touch pattern.

The mobile terminal may further include an image execute unit for displaying an image of a sliding door on a screen of the terminal. In this case, when the user's touch pattern for the terminal coincides with the stored touch pattern, the controller may output a message instructing to open the sliding door.

The mobile terminal may further include a password storage for storing a password set by a user, and a password comparator for comparing a password input via an input key with a password stored in the password storage. In this case, when the input password coincides with the stored password, the controller may output a message indicating a motion of the terminal.

The motion measure unit may measure a motion including at least one of a motion direction of the terminal, a velocity, an acceleration, an angular velocity, an angular acceleration, an amount of change in a slope, and an amount of change in a movement distance with respect to a relevant motion direction.

The motion pattern storage may store a motion pattern for at least one of a motion direction of the terminal, a velocity, an acceleration, an angular velocity, an angular acceleration, an amount of change in a slope, and an amount of change in a movement distance with respect to a relevant motion direction.

In accordance with another aspect of the present disclosure, an unlock method is provided. The method includes displaying an image on a touch detect display while an electronic device having, the touch detect display is in a user interface lock state, detecting a contact with the touch detect display, when the detected contact corresponds to moving a specific image from a first region to a second region on the touch detect display, detecting a motion of the electronic device, when the motion of the electronic device corresponds to a predetermined motion pattern, transitioning the electronic device to a user interface unlock state, and when the motion of the electronic device does not correspond to the predetermined motion pattern, maintaining the electronic device at the user interface lock state.

In accordance with still another aspect of the present disclosure, an electronic device is provided. The electronic device includes a touch detect display, one or more processors, a memory, and one or more programs stored in the memory and configured for execution by the one or more processors, wherein the program includes commands for displaying an image on the touch detect display while the electronic device having the touch detect display is in a user interface lock state, detecting a contact with the touch detect display, when the detected contact corresponds to moving a specific image from a first region to a second region on the touch detect display, detecting a motion of the electronic device, when the motion of the electronic device corresponds to a predetermined motion pattern, transitioning the electronic device to a user interface unlock state, and when the motion of the electronic device does not correspond to the predetermined motion pattern, maintaining the electronic device at the user interface lock state.

In accordance with further another aspect of the present disclosure, an unlock method is provided. The unlock method includes displaying an image on a touch detect display while an electronic device having the touch detect display is in a user interface lock state, detecting a contact with the touch detect display, when the detected contact corresponds to moving the image to a predetermined position on the touch detect display, displaying a message requesting a motion of the electronic device, when the motion of the electronic device exists, in the case where the motion of the electronic device corresponds to a predetermined motion pattern, transitioning the electronic device to a user interface unlock state, and in the case where the motion of the electronic device does not correspond to the predetermined motion pattern, maintaining the electronic device at the user interface lock state.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The following description with reference to the accompanying drawings is provided to assist in a comprehensive understanding of exemplary embodiments of the disclosure as defined by the claims and their equivalents. The present disclosure includes various specific details to assist in that understanding but these are to be regarded as merely exemplary. Accordingly, those of ordinary skill in the art will recognize that various changes and modifications of the embodiments described herein can be made without departing from the scope and spirit of the disclosure. Also, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure are provided for illustration purpose only and not for the purpose of limiting the disclosure as defined by the appended claims and their equivalents.

The present invention may be implemented in an electronic device including a mobile terminal such as, for example, a smart phone and a mobile telecommunication terminal. Hereunder, a portable terminal is used as an example for the electronic device.

The present disclosure relates to a mobile terminal for mounting a motion measure sensor thereon and performing screen unlock based on motion information of the terminal measured by the mounted motion measure sensor, and a method thereof.

Figure 1:
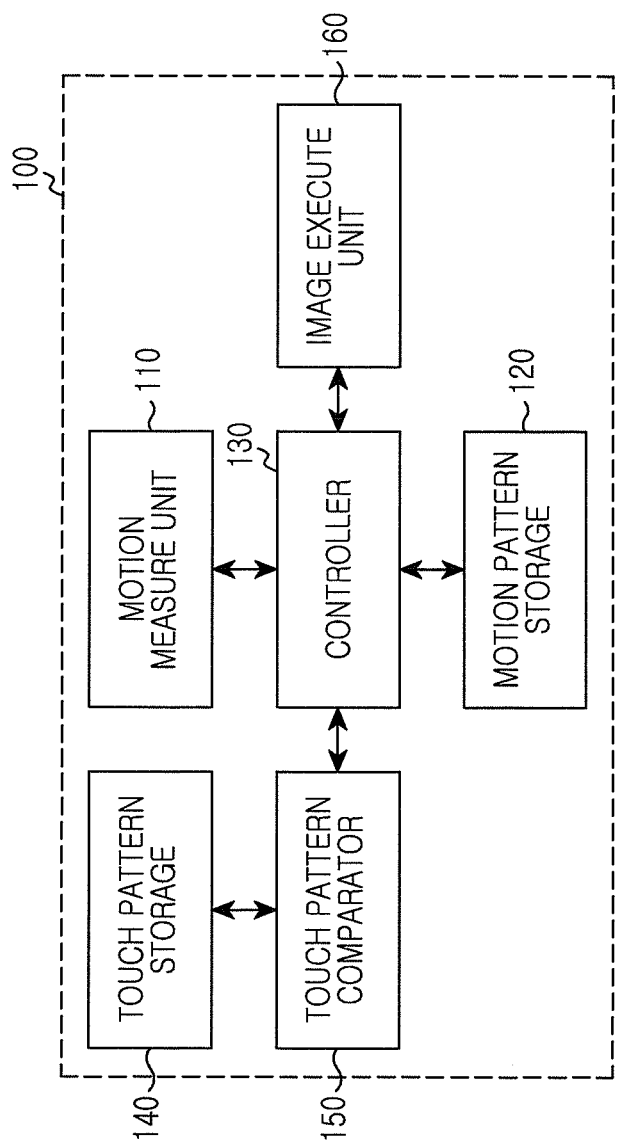
FIG. 1 illustrates a schematic block diagram of a mobile terminal executing a screen unlock based on a motion according to an exemplary embodiment of the present disclosure.

FIG. 1 illustrates a block diagram of a mobile terminal executing a screen unlock based on a motion according to an exemplary embodiment of the present disclosure.

Referring to FIG. 1, the mobile terminal 100 may include a motion measure unit 110, a motion pattern storage 120, a controller 130, a touch pattern storage 140, a touch pattern comparator 150, and an image execute unit 160. Here, the mobile terminal may include not only a Personal Digital Assistant (PDA), a cellular phone, a smart phone, a notebook, a tablet, etc. classified for each terminal type, and a mobile communication terminal such as a Personal Communication Service (PCS) phone, a Global System for Mobile communications (GSM) phone, a Wideband Code Division Multiple Access (W-CDMA) phone, a CDMA-2000 phone, a Mobile Broadband System (MBS) phone, etc. classified for each communication scheme, but also a mobile terminal such as an MP3 player, a Portable Multimedia Player (PMP), a Play Station Portable (PSP), etc. that can reproduce a moving picture or sound or install an application such as games and thus can produce moving pictures or sound or execute an application such as games. A touch detect display (not shown) may be included in the mobile terminal. The touch detect display may also be called as a touch sensitive display or a touch screen or a display.

The motion measure unit 110 may measure a motion direction of the mobile terminal 100, and a change of a velocity, an acceleration, an angular velocity, an angular acceleration, an amount of change in a slope, and an amount of change in a movement distance with respect to a relevant motion direction using a motion measure sensor such as a slope sensor, a gravity sensor, a velocity sensor, an acceleration sensor, an angular velocity sensor, a gyro sensor, etc. For example, when using the velocity sensor, an amount of change in a movement distance may be calculated using an actual measured time with respect to a measured velocity, and an acceleration may be calculated based on an amount of change in velocity per unit time. The motion measuring method using the motion measure sensor uses the known method, and detailed description thereof is omitted.

The motion pattern storage 120 stores a motion pattern set for the mobile terminal 100. For example, as illustrated in FIG. 2, the motion pattern storage 120 may set an x-axis direction of back and forth direction, an y-axis direction of left and right direction, and a straight direction of a z-axis of up and down direction with respect to the screen as basic directions, and set and store a motion pattern which in order of positive x-axis direction—negative x-axis direction— negative z-axis direction—positive y-axis direction are executed with respect to the set basic directions.

Figure 3:
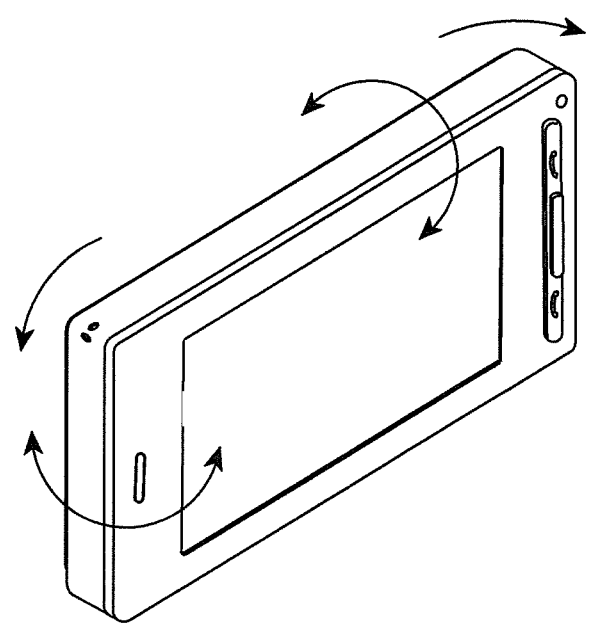
FIG. 3 illustrates another example of a motion pattern.

In addition, as illustrated in FIG. 3, the motion pattern storage 120 may set a left rotation direction and a right rotation direction around x-axis with respect to back and forth direction of the mobile terminal, a left rotation direction and a right rotation direction around y-axis with respect to left and right direction of the mobile terminal 100, and a left rotation direction and a right rotation direction around z-axis with respect to up and down direction of the mobile terminal 100 as basic directions, and set and store a motion pattern which in order of right rotation around x-axis—left rotation around x-axis—left rotation around z-axis—right rotation around y-axis are executed with respect to the set basic directions.

Figure 2:
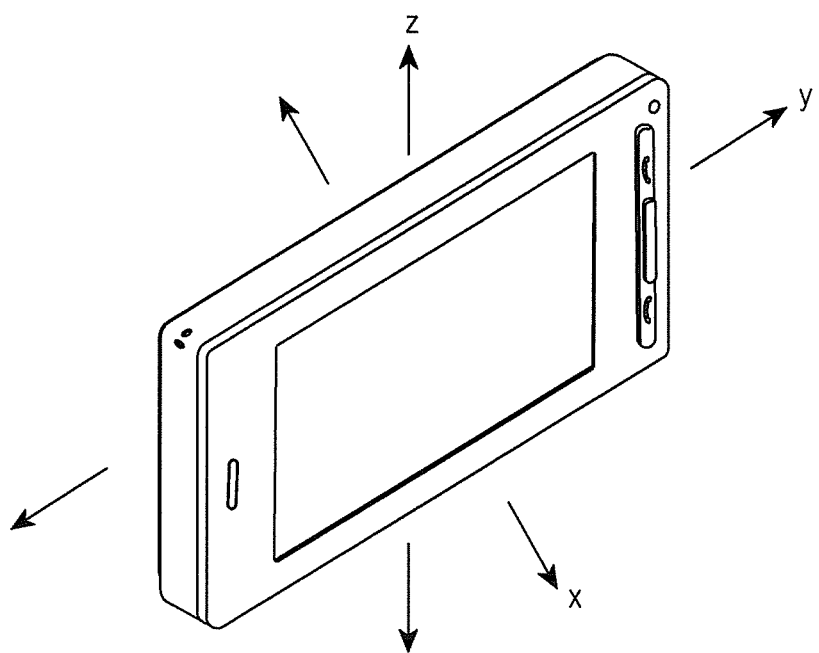
FIG. 2 illustrates an example of a motion pattern.

In addition, the motion pattern storage 120 may combine a straight direction of FIG. 2 with a rotation direction of FIG. 3 to set a basic direction, and combine a motion of the straight direction with a motion of the rotation direction with respect to the set basic direction to set and store a motion pattern. Such a motion pattern may be set and stored when the mobile terminal 100 is manufactured, and may be realized such that the motion pattern may be set, changed, or deleted by a user.

The motion pattern of the electronic device may comprise a successive motion pattern of at least two times.

The controller 130 compares a motion of the mobile terminal 110 measured by the motion measure unit 110 with a motion pattern stored in the motion pattern storage 120. When the motion of the mobile terminal 110 coincides with the motion pattern stored in the motion pattern storage 120, the controller 130 may unlock the screen of the mobile terminal.

In executing screen unlock using the motion of the mobile terminal 100, the controller 130 may control the image execute unit 160 to display an image of opening a door on the screen. For example, when the screen lock is executed, the controller 130 may control the image execute unit 160 to display an image of a closed door on the screen, and may display a message saying "please, open the door", or output a voice message. In an example where a user moves the mobile terminal 100 such as rotating a handle of the door to push or pull the same, when the motion of the mobile terminal 100 coincides with a set motion pattern, the controller 130 may control to display an image of opening the door on the screen, and may output a message or a voice message saying "the door has been opened". At this point, the image displayed on the mobile terminal 100 may be changed variously depending on the motion pattern stored in the motion pattern storage 120. For example, when the motion pattern starts in a straight direction to the left or right, an image of a sliding door may be displayed. When the motion pattern starts in a straight direction to the upper or lower side, an image of a sliding door in the upper or lower side may be displayed. When a motion of the mobile terminal 100 measured by the motion measure unit 110 coincides with the motion pattern stored in the motion pattern storage 120 with respect to an image displayed on the screen of the mobile terminal 100, the controller 130 may control the image execute unit 160 to execute a screen of an operation of opening the door displayed on the mobile terminal 100, and simultaneously, control to unlock the screen.

Figure 4:
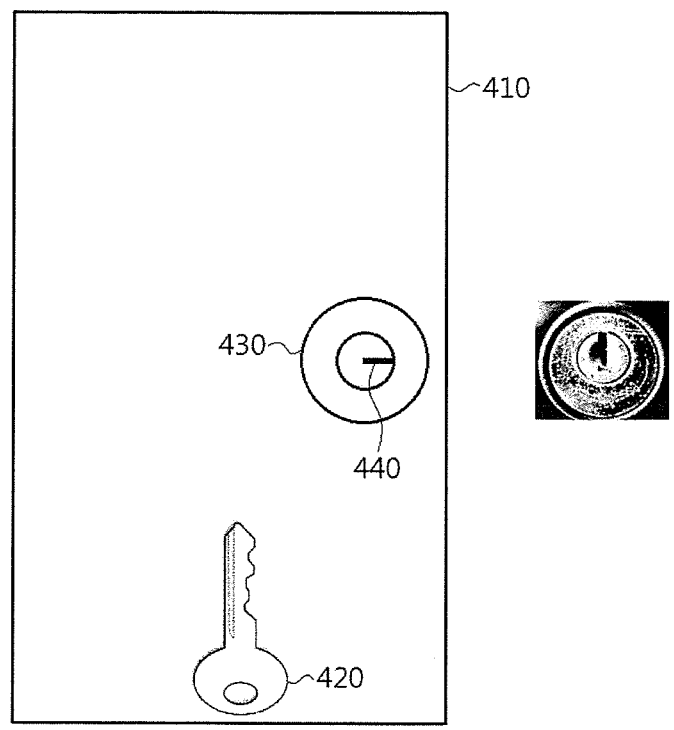
FIG. 4 illustrates an example of a touch screen image used for an exemplary embodiment of the present disclosure.
Figure 5:
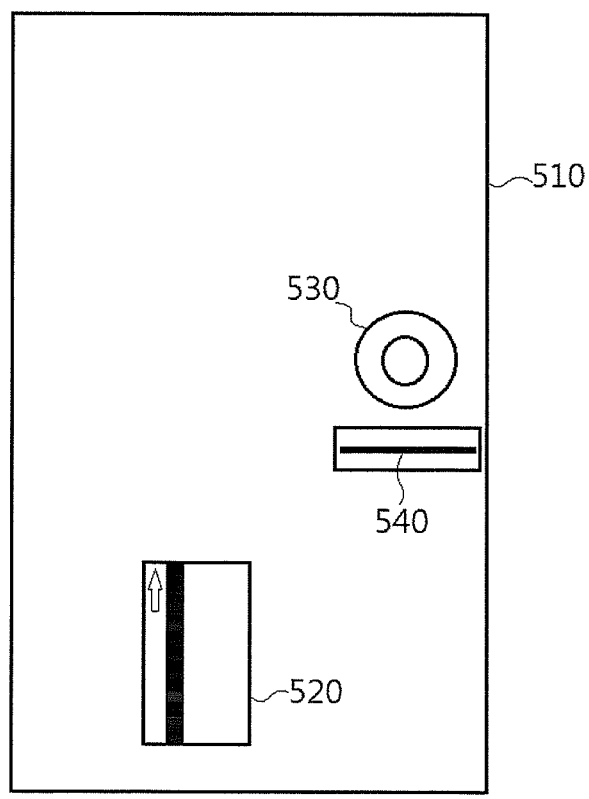
FIG. 5 illustrates another example of a touch screen image used for an exemplary embodiment of the present disclosure.

The image execute unit 160 may display an image for screen unlock of the terminal 100 on the touchscreen. When a response signal is received via the touchscreen in response to the displayed image, the controller 130 may control the motion measure unit 110 to measure a motion of the mobile terminal 100. For example, the image execute unit 160 may display a door image 410, a key image 420, a handle image 430, and a key hole image 440 on the touchscreen as illustrated in FIG. 4. When a user drags the key image 420 to insert the key 420 into the key hole 440 via the touchscreen, the controller 130 may control the motion measure unit 110 to measure a motion of the mobile terminal 100. In this example, when the user inserts the key 420 into the key hole 440 via the touchscreen, the controller 130 may display an image where the key 420 is inserted into the key hole 440. After the key 420 is inserted, when a motion pattern of rotating the key counterclockwise and a motion pattern of rotating the handle 430 in a set direction are measured by the motion measure unit 110 as illustrated in FIG. 4, the controller 130 may execute the screen unlock. Alternatively, the image execute unit 160 may display a door image 510, a card key image 520, a handle image 530, and a card key insert hole image 540 as illustrated in FIG. 5. When a user inserts the card key 520 into the card key insert hole 540 via the touchscreen, the controller 130 may control the motion measure unit 110 to measure a motion of the terminal 100. In this example, when a front portion of the card key 520 coincides with the card key insert hole 540, the controller 130 may display an image where the card key 520 is inserted into the card key insert hole 540. When a motion pattern of rotating the handle 530 in a set direction is measured, the controller 130 may execute a screen unlock. Through this, it is possible to prevent an execution malfunction of measuring a motion of the terminal 100 and executing a screen unlock even when the user does not desire the screen unlock.

The images illustrated in FIGS. 4 and 5 and the descriptions thereof are provided for an exemplary purpose only for easy understanding of the present disclosure, and an operation for stating the displaying of an image for executing the screen unlock or the measuring of the motion of the motion measure unit 110 may be modified various ways.

As described above, the motion of the terminal may be measured using the motion measure sensor mounted on the mobile terminal, and the screen unlock may be unlocked based on a measured motion, so that a more intuitive and convenient user interface may be provided to the user.

Figure 6:
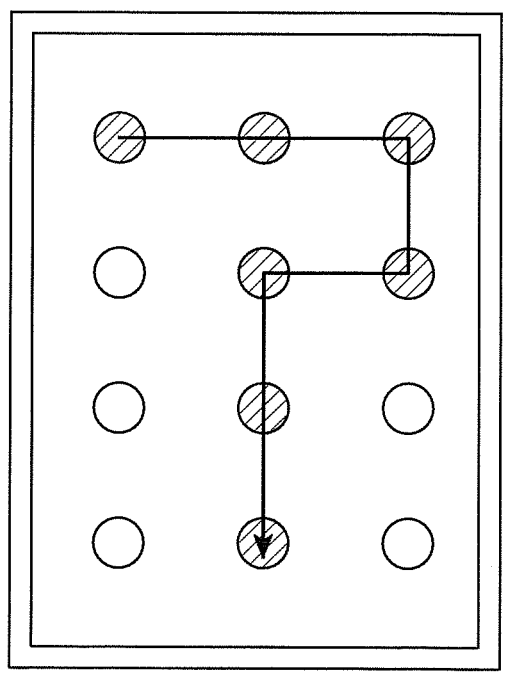
FIG. 6 illustrates an example of a touch pattern.

Meanwhile, the screen unlock function based on the motion of the mobile terminal 100 may be used in combination of a touch pattern determination. For example, as illustrated in FIG. 6, the touch pattern storage 140 may store a touch pattern set by a user, and the touch pattern comparator 150 may compare the user's touch pattern input on the screen of the mobile terminal 100 with a touch pattern stored in the touch pattern storage 140. In this example, when the user's touch pattern input on the screen coincides with a touch pattern stored in the touch pattern storage 140, the controller 130 may control the image execute unit 160 to display images of a door and a key on the screen of the mobile terminal 100, and may output a message guiding to open the door using the displayed key in the form of voice or characters. In addition, when the user drags the key up to the door in response to the output guide message, the controller 130 may output a guide message indicating a motion of the mobile terminal 100 in the form of voice or characters such as "please, rotate a key to open the door". Accordingly, the controller 130 may control the motion measure unit 110 to measure the motion of the mobile terminal 100 by the user to compare the measured motion with a motion pattern stored in the motion pattern storage 120.

Figure 7:
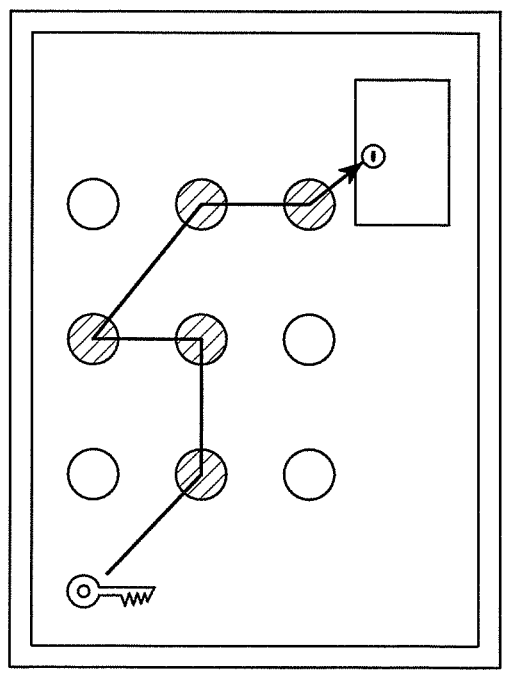
FIG. 7 illustrates an example of an image and a touch pattern by a relevant image used for an exemplary embodiment of the present disclosure.

In addition, the controller 130 may control the image execute unit 160 to simultaneously perform determination of a touch pattern and the displaying of the images of the door and the key. For example, the controller 130 may allow the door and the key to be displayed on the screen of the mobile terminal 100 via the image execute unit 160 as illustrated in FIG. 7, and may control the touch pattern comparator 150 to compare a motion pattern of the key touched by the user and dragged up to the door image with the stored touch pattern.

Therefore, the motion of the mobile terminal is reflected to the images of the door and the key displayed on the mobile terminal to allow the user to have feeling as if the user actually opened the door using, the key, and use the mobile terminal intimately and conveniently.

In addition, the user is primarily authenticated based on a touch pattern, and the user is secondarily authenticated based on the motion of the mobile terminal, so that security of personal information stored in the mobile terminal may be reinforced even more.

Though not shown, the mobile terminal 100 may further include a touchscreen unit (called also as a touch detect display, a touch sensitive display, a touch screen or a display), and the touchscreen provides an input/output interface between the mobile terminal 100 and the user. That is, the touchscreen transfers the user's touch input to the mobile terminal 100. In addition, the touchscreen shows an output of the mobile terminal 100 to the user. That is, the touchscreen shows a visual output to the user. Such a visual output is represented in the form of text, graphic, video, and a combination thereof.

The method described above in relation with figures under of the present invention may be provided as one or more instructions in one or more software modules, or computer programs stored in a memory (not shown) in an electronic device including a mobile terminal.

Figure 8:
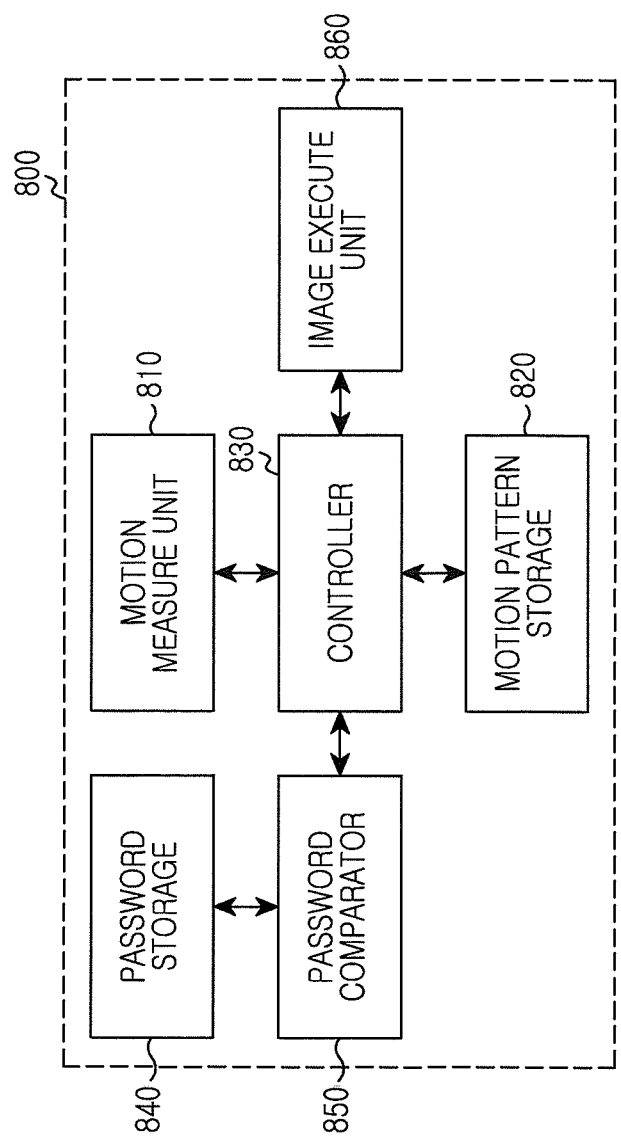
FIG. 8 illustrates a schematic block diagram of a mobile terminal executing a screen unlock based on a motion according to another exemplary embodiment of the present disclosure.

FIG. 8 illustrates a schematic block diagram of a mobile terminal executing a screen unlock based on a motion according to another exemplary embodiment of the present disclosure.

Referring to FIG. 8, the mobile terminal 800 may include a motion measure unit 810, a motion pattern storage 820, a controller 830, a password storage 840, a password comparator 850, and an image execute unit 860. Here, since the functions and operations of the motion measure unit 810, the motion pattern storage 820, and the controller 830 are the same as those of the motion measure unit 110, the motion pattern storage 120, and the controller 130 of FIG. 1, detailed descriptions thereof are omitted.

As stated above, the touch detect display (not shown) may be included in the mobile terminal. The touch detect display may also be called as the touch sensitive display or the touch screen or a display.

The password storage 840 may store a password set by the user. When the screen lock of the mobile terminal 800 is executed, the user may press an input key installed in the mobile terminal 800 or touches an input key displayed on the touchscreen to input a password. The password comparator 850 compares a password input by the user with a password stored in the password storage 840.

At this point, when the password input by the user coincides with the password stored in the password storage 840, the controller 830 may output a message indicating the motion of the mobile terminal 800, and afterward, the controller 830 may execute secondary user authentication based on the motion of the mobile terminal 800 as described above.

The method described above in relation with FIG. 8 under of the present invention may be provided as one or more instructions in one or more software modules, or computer programs stored in a memory (not shown) in an electronic device including a mobile terminal.

Figure 9:
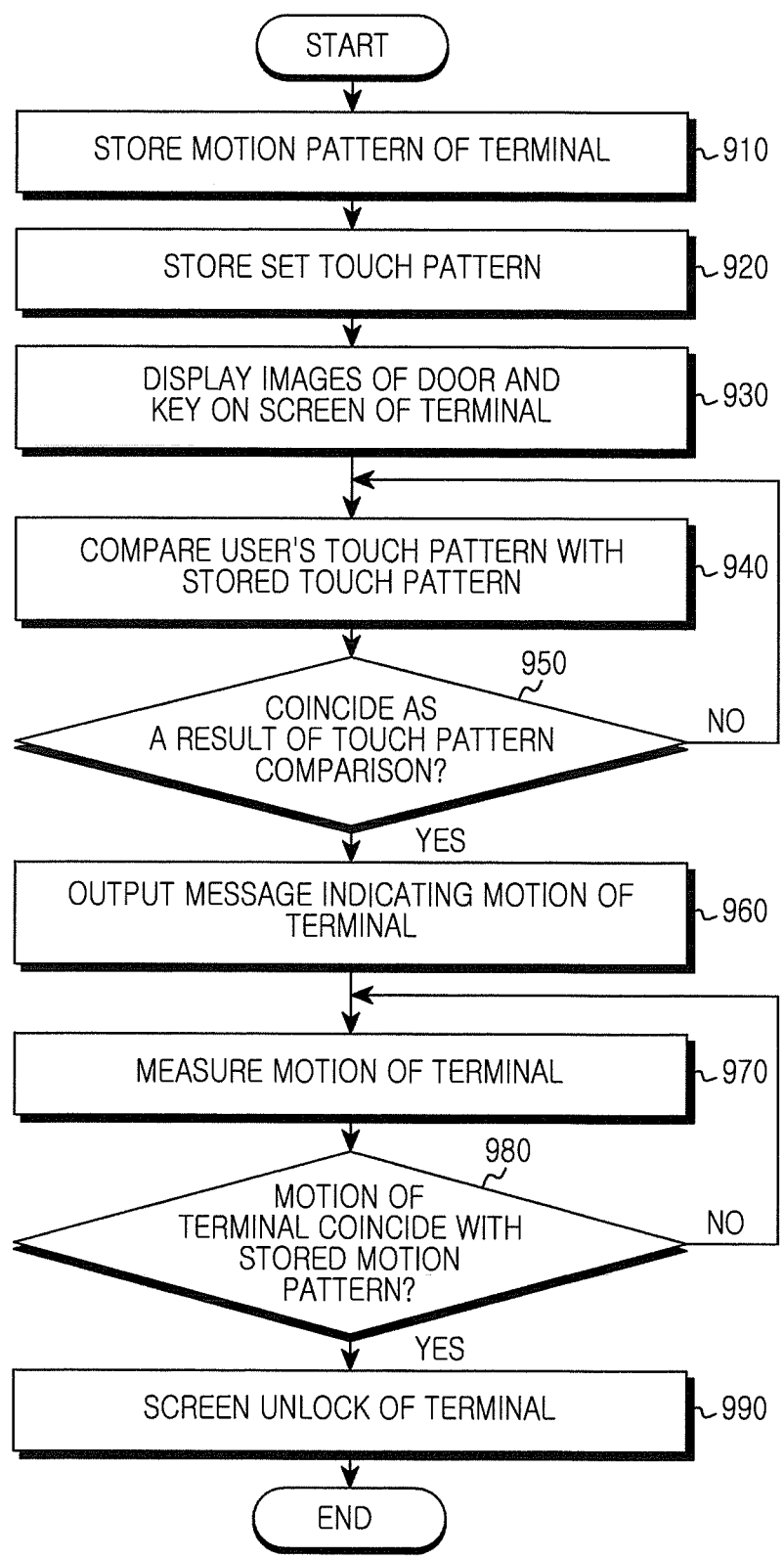
FIG. 9 illustrates a screen unlock method of a mobile terminal according to an exemplary embodiment of the present disclosure.

FIG. 9 illustrates a screen unlock method of a mobile terminal according to an exemplary embodiment of the present disclosure.

Referring to FIGS. 1 and 9, the motion pattern storage 120 may store a set motion pattern for the mobile terminal 100 (910). In addition, the touch pattern storage 140 may store a touch pattern set by the user (920). Here, though the storing of the touch pattern is performed after the motion pattern, this is only an example of a progress sequence and not limited thereto.

The image execute unit 160 may display images of a door and a key on the touchscreen of the mobile terminal 100. When the user touches the image displayed on the touchscreen, the controller 130 may control the motion measure unit 110 to measure the motion of the mobile terminal 100 (930). For example, as illustrated in FIG. 4, the image execute unit 160 may display the door image 410, the key image 420, the handle image 430, and the key hole image 4400 on the touchscreen. In this example, when the user drags the key image 420 to insert the key 420 into the key hole 440 via the touchscreen, the controller 130 may receive a response signal corresponding to the drag of the key 420 from the touchscreen, and accordingly, control the motion measure unit 110 to measure the motion of the terminal 100. At this point, when the user inserts the key 420 into the key hole 440 via the touchscreen, the controller 130 may display an image where the key 420 is inserted into the key hole 440. When a primary motion pattern like rotating the key counterclockwise after the key 420 is inserted is measured, the controller 130 may execute the screen unlock.

Alternatively, to reinforce user authentication for the unlock of the mobile terminal 100, a motion pattern may be performed in combination. For example, the controller 130 may determine whether a primary motion pattern of rotating the key counterclockwise has been measured via the motion measure unit 110 after the key 420 has been inserted into the key hole 440 in FIG. 4. In the example where the primary motion pattern has been measured, the controller 130 may determine whether a secondary motion pattern of rotating the handle 430 has been measured. In this example, the primary motion pattern and the secondary motion pattern may be discriminated via a sound effect such as "click" or a message such as "primary authentication has succeeded"

Alternatively, a screen unlock method of the mobile terminal according to the present disclosure may reinforce user authentication by combining a touch pattern with a motion pattern. For example, the touch pattern storage 140 may set and store a touch pattern of dragging the displayed key image 420 up to the key hole 440 as illustrated in FIG. 7, and the touch pattern comparator 150 may be realized to compare a motion pattern of the key image with a stored touch pattern (940). Here, though the displaying of the door image and the key image and the comparing of the touch pattern have been described via one image, the operations may be executed as separate processes as described in FIG. 6. In addition, the screen executed by the image execute unit 160 is not limited to FIG. 4 but various modifications may be possible, of course.

When it is determined by the touch pattern comparator 150 that the motion pattern of the key image coincides with the stored touch pattern (950), the controller 130 may output a guide message indicating the motion of the mobile terminal 100 (960).

When the user moves the mobile terminal 100 according to the guide message, the motion measure unit 110 measures a motion including at least one of a motion direction with respect to the motion of the mobile terminal, a velocity, an acceleration, an angular velocity, an angular acceleration, an amount of change in a slope, and an amount of change in a movement distance with respect to a relevant motion direction (970). At this point, the motion measure unit 110 may measure a motion until the motion is fixed for a set time or more again after the motion starts from a state where the motion is fixed for the set time or more, as one motion pattern. Alternatively, the motion measure unit 110 may determine the start and end of a motion using, a specific input key or a touch of a specific point, or determine the start and end of a motion using a pattern of a motion set in advance. Besides these methods, for a method for determining the start and end, for recognizing a pattern of a motion, various modified methods may be applied.

When the motion of the mobile terminal 100 by the user coincides with a motion pattern stored in the motion pattern storage 120 (980), the controller 130 may execute an operation of opening the door with respect to an image displayed by the image execute unit 160 and output a corresponding sound effect or message, thereby executing the screen unlock (990).

Though the controller 130 performs a procedure for comparing a touch pattern with a touch pattern stored in advance, and then measures the motion of the terminal to compare the measured motion with a motion pattern stored in advance in FIG. 9, the controller 130 may measure the motion of the terminal to compare the measured motion with the motion pattern stored in advance, and then compare the touch pattern with the touch pattern stored in advance.

The method described above in relation with FIG. 9 under of the present invention may be provided as one or more instructions in one or more software modules, or computer programs stored in a memory (not shown) in an electronic device including a mobile terminal.

Figure 10:
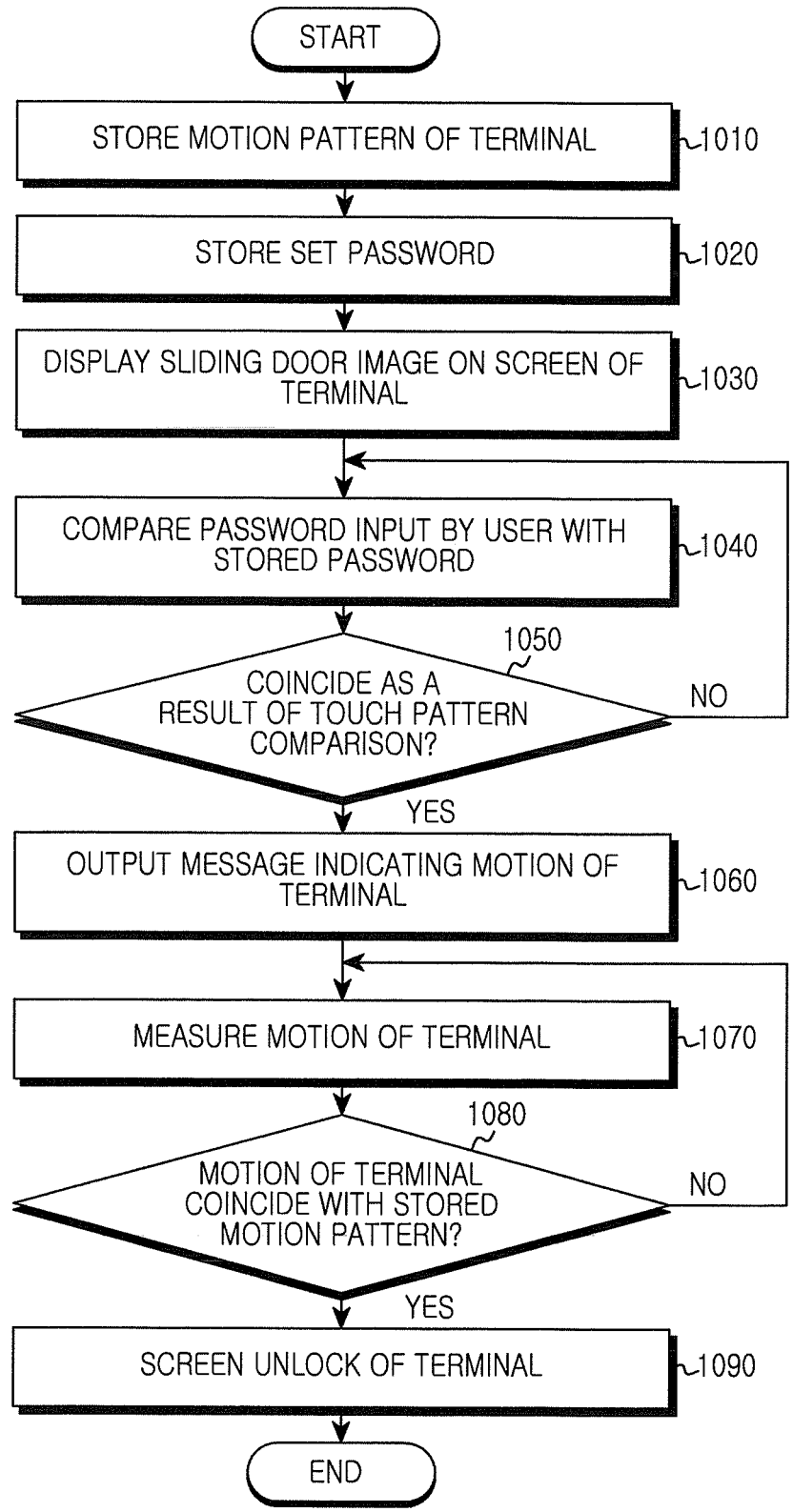
FIG. 10 illustrates a screen unlock method of a mobile terminal according to another exemplary embodiment of the present disclosure.

FIG. 10 illustrates a screen unlock method of a mobile terminal according to another exemplary embodiment of the present disclosure.

Referring to FIGS. 8 and 10, a motion pattern storage 820 may store a motion pattern set for the mobile terminal 800 (1010). In addition, the password storage 840 may store a password set by the user (1020). Here, though the drawing illustrates that the storing of the password is performed after the motion pattern, this is only an example of a progress sequence and not limited thereto.

An image execute unit 860 may display an image of a sliding door or display an image of an input keypad of numbers and letters for inputting a password, and an image of a sliding door on the screen of the mobile terminal 800 (1030). At this point, the image of the door that can be displayed on the screen of the mobile terminal 800 is not limited to the image of the sliding door, of course.

When the user inputs a password via an input key installed in the mobile terminal 800 or touches the input keypad image to input a password, a password comparator 850 may compare the input password with a password stored in a password storage 840 (1040).

When the input password coincides with the stored password (1050), the controller 830 may output a guide message indicating the motion of the mobile terminal 800 (1060). Here, though the drawing illustrates that the image of the sliding door is displayed and then a guide message indicating the motion is output according to the input of the user's password, the mobile terminal may receive the password from the user, and when the input password coincides with the stored password, may output the image of the sliding door and the guide message.

When the user moves the mobile terminal 800 according to the guide message, the motion measure unit 810 measures a motion including at least one of a motion direction with respect to the motion of the mobile terminal 800, a velocity, an acceleration, an angular velocity, an angular acceleration, an amount of change in a slope, and an amount of change in a movement distance with respect to a relevant motion direction (1070).

When the motion of the mobile terminal 800 by the user coincides with a motion pattern stored in the motion pattern storage 820 (1080), the controller 830 may execute an operation of opening the sliding door with respect to an image displayed by the image execute unit 860 and output a corresponding sound effect or message, thereby executing the screen unlock (1090).

The method described above in relation with FIG. 10 under of the present invention may be provided as one or more instructions in one or more software modules, or computer programs stored in a memory (not shown) in an electronic device including a mobile terminal.

Figure 11:
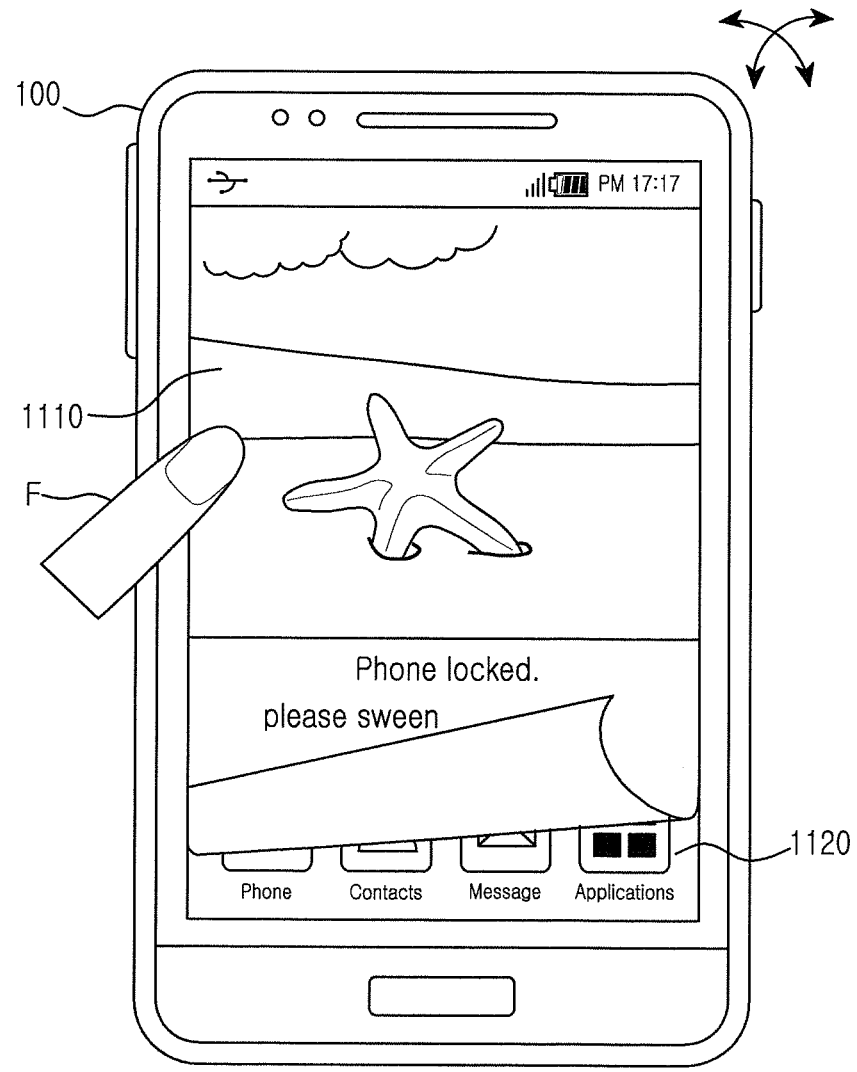
FIG. 11 illustrates an example of a touch screen image according to a motion of a mobile terminal used for an exemplary embodiment of the present disclosure.
Figure 12:
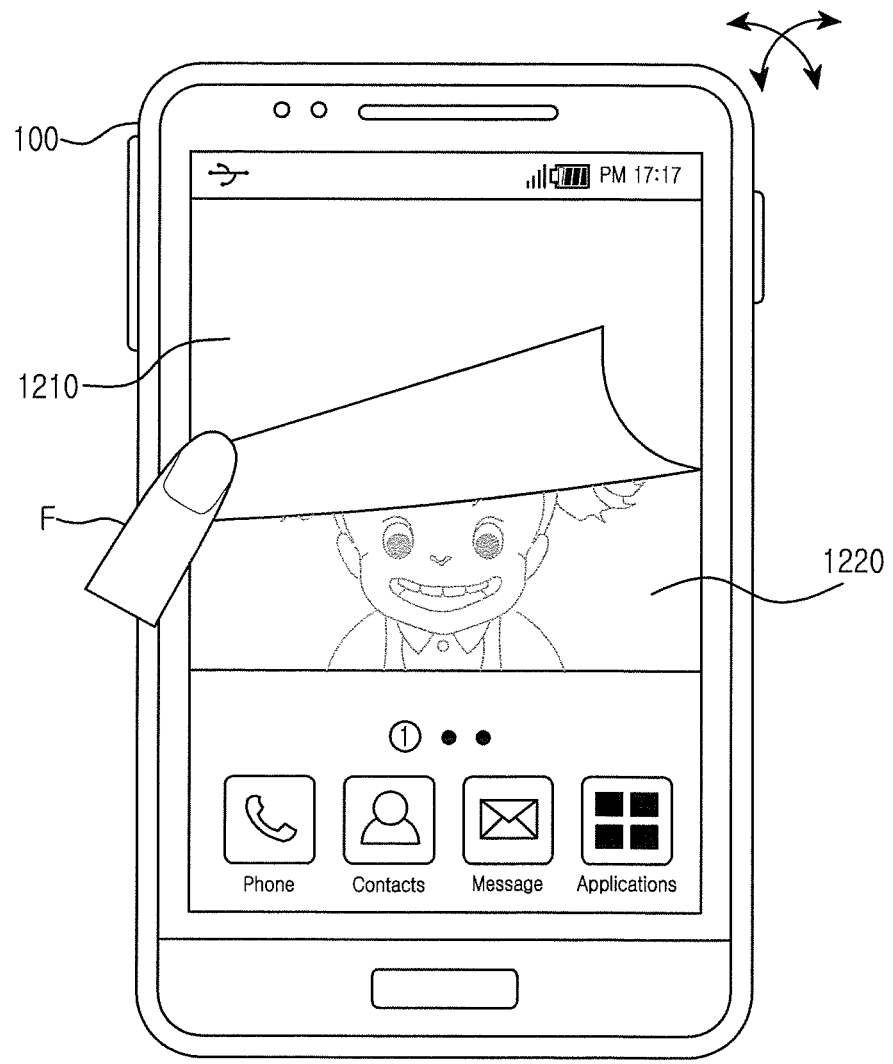
FIG. 12 illustrates another example of a touch screen image used according to a motion of a mobile terminal for an exemplary embodiment of the present disclosure.

FIG. 11 and FIG. 12 together illustrate an example of a touch screen image according to degree of a motion of a mobile terminal used for an exemplary embodiment of the present disclosure. Here, the mobile terminal is one example of an electronic device.

FIG. 11 illustrates a touch screen image and FIG. 12 illustrates a degree of turnover of a screen page in a touch screen image according to degree of a motion of a mobile terminal.

In locked state, a touch screen image representing the locked state is displayed. And the mobile terminal stores a touch gesture for unlocking the locked screen image which is predefined. The touch gesture may a single touch or a single gesture which is to be maintained for a predetermined period.

Unlock of the screen of mobile terminal may be performed when a motion of the mobile terminal corresponding to a predetermined motion is detected while, for example, the single touch is maintained. The predetermined motion may be a motion which is performed in up, down, right or, left direction or a combination of these directions performed by the user's hand. The mobile terminal may be rotated using an elbow of the user as an axis. The gyro sensor is used to detect the rotation of the mobile terminal in the mobile terminal.

The user holds up the mobile terminal using an elbow while the touch in the touch screen is maintained over the predetermined time to unlock the screen of the mobile terminal. That is, unlock of the screen of the mobile terminal may be performed when the mobile terminal is moved up in a rotation-like motion while the touch in the touch screen is maintained.

Also, the user holds up the mobile terminal using an elbow while the touch in the touch screen is maintained over the predetermined time and release the touch to unlock the screen of the mobile terminal. That is, unlock of the screen of the mobile terminal may be performed when the mobile terminal is moved up in a rotation like motion while the touch in the touch screen is maintained and then the touch is released.

The embodiment according to FIG. 11 and FIG. 12 of the present invention may be described in another way hereunder.

A turnover of a page of the touch screen image is illustrated according to degree of a motion of a mobile terminal 100 measured by the motion measurement measure unit 110 is illustrated. Unlock of the screen of the mobile terminal may be performed by a degree of motion of the mobile terminal. Also, the degree of turnover of a page of the touch screen image may be in accordance with the motion of the mobile terminal. For example, if degree of the motion of the mobile terminal is ¼ of the required motion, then ¼ of the screen page may be turned over. That means that ¾ of the locked screen page 1110 may be displayed and ¼ of the main page (or a page representing a prior performance before the page is locked) 1120 may be displayed underneath the locked screen as illustrated in FIG. 11. In this way, as illustrated in FIG. 12, if degree of the motion of the mobile terminal is ½ of the required motion, then ½ of the screen page may be turned over. That means that ½ of the locked screen page 1210 may be displayed and ½ of the main page (or a page representing a prior performance before the page is locked) 1220 may be displayed underneath the locked screen. But, it is also possible to set a condition that locked screen page 1110, 1210 may be fully disappeared and the main page (or a page representing a prior performance before the page is locked) 1120, 1220 may be fully displayed only when the motion of the mobile terminal is fully performed according to the predetermined way.

Also, a touch by, for example, a finger (F) in a predetermined way on a touch detect display may be used as another prior requirement to unlock the screen of the mobile terminal with a degree of motion of a mobile terminal. The first touch may use examples described in the specification with reference to other figures. For example, the first touch may be a first gesture including a touch and a drag of the touch from the touch point to the predetermined location illustrated in FIG. 4, FIG. 5, FIG. 6 and FIG. 7. Also, the first touch may include multi touches.

Also, there may be requirements for the time maintained before the motion of the mobile terminal. For example, the motion of the mobile terminal may be required within a predetermined time period, for example, two seconds or three seconds. If there is no the motion of the mobile terminal, a request to need input of the first touch again may be displayed on the touch detect display. That is, an image is displayed on a touch detect display while an electronic device having the touch detect display is in the user interface lock state. The image may be images illustrated in FIG. 4 or FIG. 5. Then, if an image contact on the touch detect display according to a predetermined pattern such as moving the image to the predetermined position or a predetermined touch pattern as illustrated in FIG. 6 is detected, the controller (microprocessor) 830 controls to display a message requesting a motion of the electronic device or output a voice requesting the motion of the electronic device. Also, a release of the touch (the image contact) may be further required to unlock of the screen of the mobile terminal after the motion of the mobile terminal or at substantially same time with the motion of the mobile terminal.

Regarding the motion of the mobile terminal, a first motion pattern of the mobile terminal is detected, a screen unlock of the mobile terminal is executed if the first motion pattern corresponds to the second motion pattern stored in the mobile terminal and also the image contact is released. Here, the release of the image contact may be performed after detecting the first motion pattern corresponding to the second motion pattern stored in the mobile terminal or may be performed at the substantially same time with detecting the first motion pattern corresponding to the second motion pattern stored in the mobile terminal. Also, when the first motion pattern corresponds to the second motion pattern, the mobile terminal may output a sound effect corresponding to the user interface unlock state and when the first motion pattern of the mobile terminal does not correspond to the predetermined motion pattern, the mobile terminal may output a sound effect corresponding to the user interface lock state.

Figure 13:
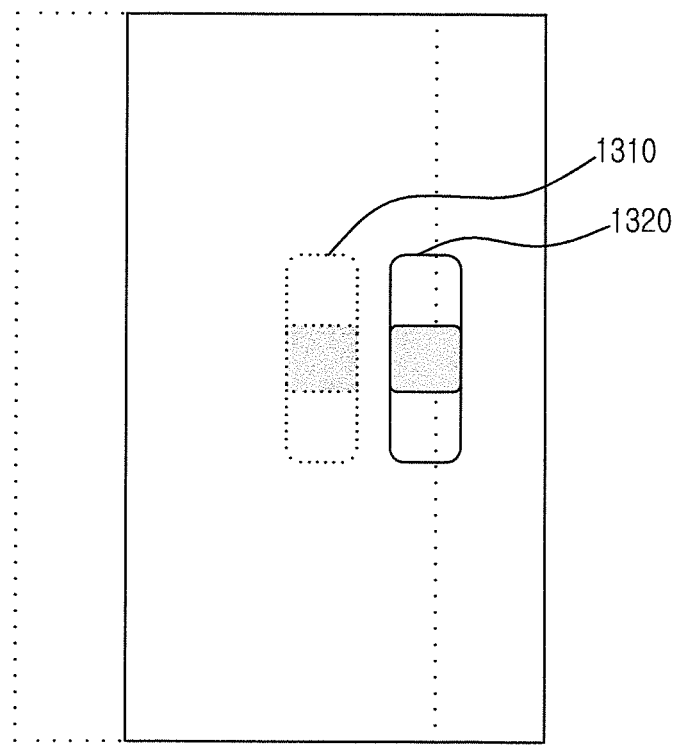
FIG. 13 illustrates another example of a touch screen image used for an exemplary embodiment of the present disclosure.

FIG. 13 illustrates another example of a touch screen image used for an exemplary embodiment of the present disclosure. It may be described in comparison with reference to FIG. 4 or FIG. 5. A door image from the door image anywhere (not shown) on the touch screen is moved to a predetermined location door image 1310 by a gesture. Then, a mobile terminal (an electronic device) is moved in a predetermined motion pattern and accordingly the door image is moved to a door image 1320, the screen unlock is performed. The door image in FIG. 13 is an image representing the locked state of the screen of the mobile terminal. The motion relation described with reference to FIG. 11 and FIG. 12 is also applicable to the embodiment in FIG. 13.

Figure 14:
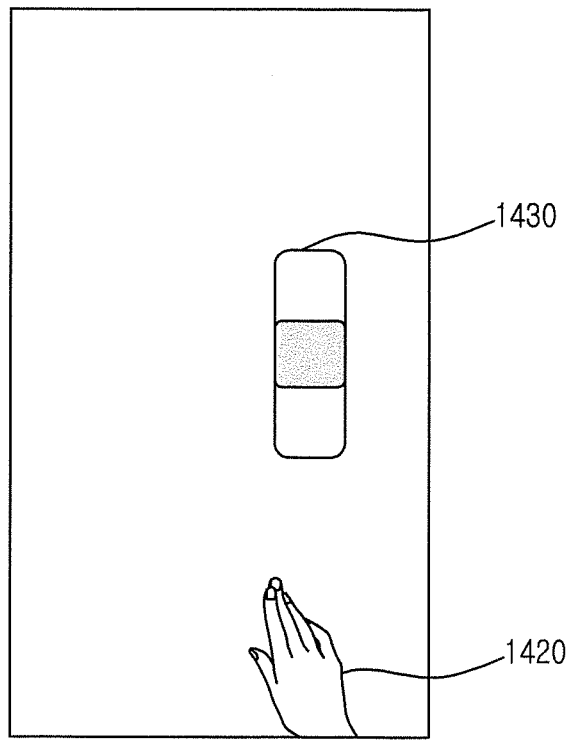
FIG. 14 illustrates another example of a touch screen image used for an exemplary embodiment of the present disclosure.

FIG. 14 illustrates another example of a touch screen image used for an exemplary embodiment of the present disclosure. It also may be described in comparison with reference to FIG. 4 or FIG. 5. A hand image 1420 is moved to a predetermined location of a door 1430 by a gesture on the touch screen. Then, a mobile terminal (an electronic device) is moved in a predetermined motion pattern (not shown), the screen unlock is performed. The motion relation described with reference to FIG. 11 and FIG. 12 is also applicable to the embodiment in FIG. 14.

It will be appreciated that embodiments of the present disclosure according to the claims and description in the specification can be realized in the form of hardware, software or a combination of hardware and software. Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

According to the present disclosure, it is possible to measure the motion of a terminal using a motion measure sensor mounted on the mobile terminal, and execute a screen unlock based on the measured motion, so that more intuitive and convenient user interface may be provided to a user.

In addition, the present disclosure displays an image of a door on a mobile terminal, and reflects the motion of the mobile terminal on a relevant image to allow the user to have feeling as if the user actually opened the door, and to use the mobile terminal intimately and conveniently.

In addition, the present disclosure allows a screen unlock function based on the motion of a mobile terminal to cooperate with another screen unlock function to use these functions in combination, thereby reinforcing even more security of personal information stored in the mobile terminal.

Although the disclosure has been shown and described with reference to certain exemplary embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. A mobile terminal comprising:
  a motion measure unit configured to measure a first motion pattern of the terminal;
  a motion pattern storage configured to store a second motion pattern set for unlocking the terminal wherein the second motion pattern includes a motion pattern having at least two directions; and
  a controller configured to:
    in response to the first motion pattern matching the second motion pattern, provide a user interface for receiving a confirmation input for unlocking a screen of the terminal from a user on a screen of the electronic device; and
    in response to receiving the confirmation input from the user, unlock the screen of the terminal.

2. The mobile terminal of claim 1, further comprising an image execute unit configured to displaying an image for screen unlock of the terminal,
  wherein the controller is configured to control the motion measure unit to measure the motion pattern of the terminal when a response signal is received via a touchscreen in response to the displayed image.

3. The mobile terminal of claim 1, further comprising:
  a touch pattern storage configured to store a touch pattern; and
  a touch pattern comparator configured to compare a touch pattern input for the terminal with the touch pattern stored in the touch pattern storage,
  wherein when the touch pattern input for the terminal coincides with the stored touch pattern, the controller is configured to output a message requesting a motion of the terminal.

4. The mobile terminal of claim 3, further comprising an image execute unit configured to display images of a door and a key on a screen of the terminal,
  wherein the touch pattern comparator is configured to compare a movement pattern of the key image which is touched by the user and dragged up to the door image with the stored touch pattern.

5. The mobile terminal of claim 3, further comprising an image execute unit configured to display an image of a sliding door on a screen of the terminal,
  wherein when the touch pattern input by the user for the terminal coincides with the stored touch pattern, the controller is configured to output a message instructing to open the sliding door.

6. The mobile terminal of claim 1, further comprising:
  a password storage configured to store a password set by a user; and
  a password comparator configured to compare a password input via an input key with the password stored in the password storage,
  wherein when the input password coincides with the stored password, the controller is configured to output a message requesting a motion of the terminal.

7. The mobile terminal of claim 1, wherein the motion measure unit is configured to measure a motion comprising at least one of a motion direction of the terminal, a velocity, an acceleration, an angular velocity, an angular acceleration, an amount of change in a slope, and an amount of a movement distance.

8. The mobile terminal of claim 1, wherein the motion pattern storage is configured to store a motion pattern for at least one of a motion direction of the terminal, a velocity, an acceleration, an angular velocity, an angular acceleration, an amount of change in a slope, and an amount of a movement distance.

9. The mobile terminal of claim 1, wherein the user interfaces comprise a key and a destination, and the user confirms the first motion pattern for unlocking the mobile terminal by dragging the key onto the destination.

10. A method for unlocking an electronic device, comprising:
  detecting a first motion pattern of the electronic device wherein the first motion pattern includes a motion pattern having at least two directions; and
  when the first motion pattern corresponds to the second motion pattern stored in the electronic device, the second motion pattern for unlocking the electronic device, providing a user interface for receiving a confirmation input for unlocking the electronic device from a user on a screen of the electronic device; and in response to receiving the confirmation input from the user, unlocking the electronic device.

11. The method of claim 10, further comprising:
detecting a contact corresponding to moving an image from a first region to a second region on a touch detect display, displaying a message requesting a motion of the electronic device or outputting voice requesting the motion of the electronic device.

12. The method of claim 10, further comprising:
when the first motion pattern corresponds to the second motion pattern, outputting a sound effect corresponding to the user interface unlock state; and
when the first motion pattern of the electronic device does not correspond to a predetermined motion pattern, outputting a sound effect corresponding to the user interface lock state.

13. The method of claim 10, wherein the first motion pattern of the electronic device comprises at least two successive motion patterns.

14. The method of claim 10, wherein the first motion pattern of the electronic device is determined by at least one of a velocity, an acceleration velocity, an angular velocity, an angular acceleration, an amount of change in a slope, and an amount of a movement distance.

15. The method of claim 10, wherein the first motion pattern of the electronic device is determined by a gyro sensor.

16. An electronic device comprising:
a touch detect display;
a memory comprising one or more programs; and
one or more processors configured to execute the one or more programs to:
display an image on the touch detect display while the electronic device having the touch detect display is in a user interface lock state,
detect a contact on the touch detect display,
when the detected contact corresponds to moving the image from a first region to a second region on the touch detect display, detect a motion of the electronic device, and
when the motion of the electronic device corresponds to a predetermined motion pattern for unlocking the electronic device, provide a user interface for receiving a confirmation input for unlocking the electronic device from a user; and
in response to receiving the confirmation input from the user, unlock the electronic device.

17. The electronic device of claim 16, wherein the one or more processors are further configured to execute the one or more programs to:
display a message requesting a motion of the electronic device or output voice requesting the motion of the electronic device when the detected contact corresponds to the moving of a specific image from the first region to the second region on the touch detect display.

18. The electronic device of claim 17, wherein the one or more processors are further configured to execute the one or more programs to:
output a sound effect corresponding to the user interface unlock state when the motion of the electronic device corresponds to a predetermined motion pattern, and
output a sound effect corresponding to the user interface lock state when the motion of the electronic device does not correspond to the predetermined motion pattern.

19. The electronic device of claim 16, wherein the motion of the electronic device comprises at least two successive motion patterns.

20. The electronic device of claim 16, wherein the motion of the electronic device is determined by at least one of a velocity, an acceleration velocity, an angular velocity, an angular acceleration, an amount of change in a slope, and an amount of a movement distance.

21. An unlock method comprising:
displaying an image on a touch detect display while an electronic device having the touch detect display is in a user interface lock state;
detecting a contact with the touch detect display;
when the detected contact corresponds to moving the image to a predetermined position on the touch detect display, displaying a message requesting a motion of the electronic device;
when the motion of the electronic device exists and the motion of the electronic device corresponds to a predetermined motion pattern for unlocking the electronic device, provide a user interface for receiving a confirmation input for unlocking the electronic device from a user, and in response to receiving the confirmation input from the user, unlock the electronic device to a user interface unlock state; and
when the motion of the electronic device does not correspond to the predetermined motion pattern, maintaining the electronic device at the user interface lock state,
wherein the lock state displayed on the touch detect display includes at least one image that implies a motion pattern to unlock the lock state.

22. The method of claim 21, further comprising:
when the motion of the electronic device corresponds to a predetermined motion pattern, outputting a sound effect corresponding to the user interface unlock state; and
when the motion of the electronic device does not correspond to the predetermined motion pattern, outputting a sound effect corresponding to the user interface lock state.

23. A method for unlocking an electronic device, comprising:
displaying an image indicating for an unlock of user interface lock state on a touch detect display while an electronic device having the touch detect display is in the user interface lock state;
detecting a drag on the image for moving the image to a predetermined position on the touch detect display;
detecting a first motion pattern of the electronic device; and
when the first motion pattern corresponds to the second motion pattern stored in the electronic device, the second motion pattern for unlocking the electronic device, providing a user interface for receiving a confirmation input for unlocking the electronic device from a user; and
in response to receiving the confirmation input from the user, unlocking the electronic device.

24. The method of claim 23, further comprising:
when the first motion pattern corresponds to the second motion pattern, outputting a sound effect corresponding to the user interface unlock state; and
when the first motion pattern of the electronic device does not correspond to a predetermined motion pattern, outputting a sound effect corresponding to the user interface lock state.

25. An electronic device, comprising:
a touch pattern storage configured to store a touch pattern indicating for an unlock of user interface lock state;
a touch pattern comparator configured to compare a touch pattern input for the electronic device with the touch pattern stored in the touch pattern storage, wherein when the touch pattern input for the terminal coincides with the stored touch pattern, the controller is configured to output a message requesting a motion of the electronic device, a motion measure unit configured to measure a first motion pattern of the electronic device;

a motion pattern storage configured to store a second motion pattern set for the electronic device, the second motion pattern for unlocking the electronic device; and a controller configured to, when the first motion pattern of the terminal measured by the motion measure unit corresponds to the second motion pattern stored in the motion pattern storage, provide a user interface for receiving a confirmation for unlocking the electronic device from a user, and in response to receiving the confirmation from the user, unlock the electronic device.

26. The electronic device of claim 25, wherein the first motion pattern of the electronic device is determined by a gyro sensor.

27. A method for unlocking an electronic device, comprising:

detecting a first circular motion pattern of the electronic device by a gyro sensor; and when the first motion pattern corresponds to the second motion pattern stored in the electronic device, the second motion pattern for unlocking the electronic device, providing a user interface for receiving a confirmation input for unlocking the electronic device from a user on a screen of the electronic device; and in response to receiving the confirmation input from the user, unlocking the electronic device.

28. The method of claim 27, further comprising:

when the first motion pattern corresponds to the second motion pattern, outputting a sound effect corresponding to the user interface unlock state; and when the first motion pattern of the electronic device does not correspond to a predetermined motion pattern, outputting a sound effect corresponding to the user interface lock state.

29. The method of claim 27, further comprising:

prior to detecting the first circular motion pattern, detecting a contact corresponding to a predetermined touch input on a touch detect display, displaying a message requesting a motion of the electronic device or outputting voice requesting the motion of the electronic device.

30. An electronic device, comprising:

a motion measure unit configured to measure a first motion pattern of the electronic device by a gyro sensor;

a storage configured to store a second motion pattern for the electronic device, the second motion pattern for unlocking the electronic device; and a controller configured to, when the first motion pattern of the electronic device measured by the motion measure unit corresponds to the second motion pattern stored in the motion pattern storage, providing a user interface for receiving a confirmation input for unlocking the electronic device from a user, and in response to receiving the confirmation input from the user through the user interface, unlock the electronic device.

31. The electronic device of claim 30, wherein the first motion pattern of the electronic device includes a circular motion.

32. The electronic device of claim 30, further comprising:

a touch pattern storage configured to store a touch pattern; and a touch pattern comparator configured to compare a touch pattern input for the electronic device with the touch pattern stored in the touch pattern storage, wherein when the touch pattern input coincides with the stored touch pattern, the controller is configured to output an instruction indicating a motion of the electronic device.

33. A method for unlocking an electronic device comprising:

displaying an image on a touch detect display while an electronic device having the touch detect display is in the user interface lock state;

detecting a contact on the image for moving the image to a predetermined position on the touch detected display;

detecting a first motion pattern of the electronic device; and when the first motion pattern corresponds to a second motion pattern stored in the electronic device, the second motion pattern for unlocking the electronic device, providing a user interface for receiving a confirmation input for unlocking the electronic device from a user; and in response to receiving the confirmation input from the user, unlocking the electronic device.

34. The method of claim 33, further comprising:

when the first motion pattern corresponds to the second motion pattern, outputting a sound effect corresponding to the user interface unlock state; and when the first motion pattern of the electronic device does not correspond to the predetermined motion pattern, outputting a sound effect corresponding to the user interface lock state.

35. An electronic device, comprising:

a motion measure unit configured to measure a first motion pattern of the electronic device;

a storage configured to store a second motion pattern for the electronic device; and a controller configured to:

when the first motion pattern of the terminal measured by the motion measure unit corresponds to the second motion pattern stored in the storage, provide a user interface for receiving a confirmation input for unlocking the electronic device from a user on a screen; and in response to receiving the confirmation input from the user, unlock the electronic device.

36. The electronic device of claim 35, wherein the first motion pattern of the electronic device is determined by a gyro sensor.

* * * * *